United States Patent [19]
Shufflebotham et al.

[11] Patent Number: 6,086,246
[45] Date of Patent: Jul. 11, 2000

[54] TWO-ELEMENT PLASMA RESISTANT LIGHTPIPE ASSEMBLY

[75] Inventors: Paul Kevin Shufflebotham; Heinrich Von Bunau, both of San Jose, Calif.

[73] Assignee: Novellus Systems, Inc., San Jose, Calif.

[21] Appl. No.: 09/085,149

[22] Filed: May 26, 1998

[51] Int. Cl.[7] .................................. G01J 5/06; G01J 5/10; G01J 5/30; G01M 15/00

[52] U.S. Cl. .......................... 374/121; 374/126; 374/131; 374/161; 374/133; 374/128

[58] Field of Search ................................. 374/121, 126, 374/131, 161, 128, 133

[56] References Cited

U.S. PATENT DOCUMENTS

| | | | |
|---|---|---|---|
| 4,679,934 | 7/1987 | Gangluly et al. | 374/131 |
| 4,845,647 | 7/1989 | Dils et al. | 364/557 |
| 4,956,538 | 9/1990 | Moslehi | 374/126 |
| 5,226,732 | 7/1993 | Nakos et al. | 374/126 |
| 5,255,980 | 10/1993 | Thomas et al. | 374/131 |
| 5,381,229 | 1/1995 | Murphy et al. | 374/131 |
| 5,442,727 | 8/1995 | Fiory | 392/416 |
| 5,660,472 | 8/1997 | Peuse et al. | 374/128 |
| 5,893,643 | 4/1999 | Kumar et al. | 374/121 |

*Primary Examiner*—G. Bradley Bennett
*Assistant Examiner*—Gail Verbitsky
*Attorney, Agent, or Firm*—Skjerven, Morill, MacPherson, Franklin and Friel

[57] ABSTRACT

A plasma resistant lightpipe is used in a pyrometric temperature measurement system to measure the temperature of a substrate in a reaction chamber. The plasma resistant lightpipe includes two lightpipe elements. The first lightpipe element, which may be a sapphire rod or aluminum nitride rod, is positioned within a backside gas delivery path to the chamber. The first lightpipe element is resistant to etching caused by reactive plasmas or gases used within the chamber, such as fluorine. The second lightpipe, which is a quartz rod, is positioned beneath the first lightpipe element such that the two lightpipe elements are optically coupled. The first lightpipe element may be directly mounted in the base plate or electrostatic chuck of the pedestal assembly or directly mounted in a plug, which is then positioned within the base plate or electrostatic chuck. The first lightpipe element is securely mounted into the base plate, electrostatic chuck, or the plug by shrink and/or interference fitting, by spring pins or set screws. In one embodiment, the interface between the first lightpipe element and the second lightpipe element is set in a plane defined by the top surface of the seal plate. Thus, there is little danger of damaging the lightpipe elements during the removal of the electrostatic chuck and base plate.

32 Claims, 8 Drawing Sheets

TWO-ELEMENT PLASMA RESISTANT LIGHTPIPE ASSEMBLY

FIELD OF THE INVENTION

The present invention relates to pyrometers, and in particular to a lightpipe assembly used in pyrometric measurement system.

BACKGROUND

As is well known in the art, a pyrometric system is used to measure the temperature of a substrate by sensing the intensity or wavelength of light generated by the substrate. Typically, a pyrometric system uses a lightpipe that serves as a high quality infrared ("IR") optical path between the substrate and the pyrometer monitor. The pyrometer monitor receives the measured intensity or wavelength of light from the optical path and converts the measurement into a temperature scale. Pyrometric systems are often used to measure the temperature of semiconductor wafers in plasma reaction chambers and other types of processing chambers.

Figure 1:
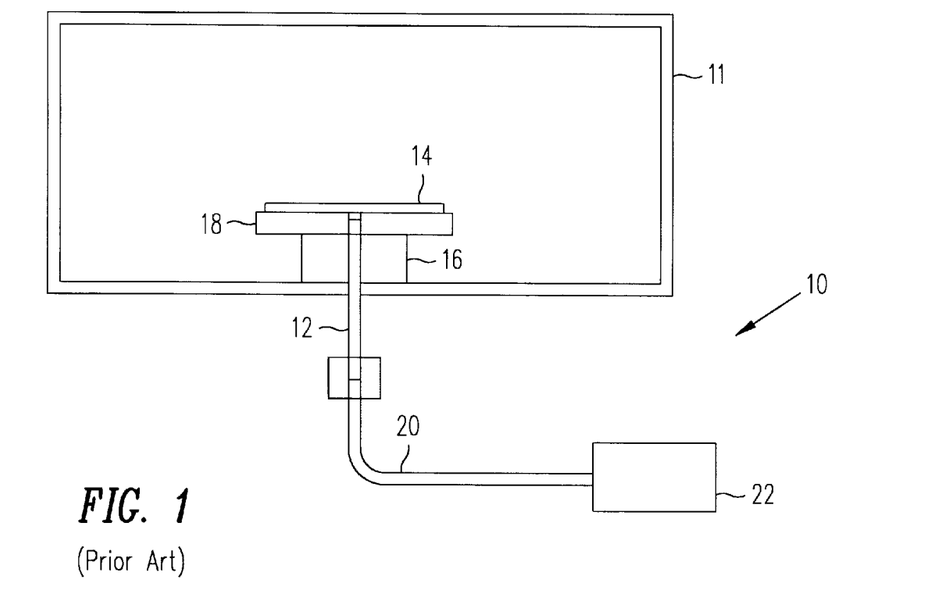
FIG. 1 is a simplified diagram of a conventional pyrometric assembly for a semiconductor wafer processing chamber.

FIG. 1 is a simplified diagram of a conventional pyrometric system 10 for a semiconductor wafer processing chamber 11 with a lightpipe 12 as an optical path between the wafer 14 and the pyrometric monitor 22. As shown in FIG. 1, lightpipe 12 extends through the walls of chamber 11, through a pedestal assembly 16 and electrostatic chuck 18, which holds wafer 14. The end of lightpipe 12 receives IR radiation emitted by the back side of wafer 14. Lightpipe 12 is coupled to an optical fiber cable 20 that is received by pyrometric monitor 22.

Figure 2:
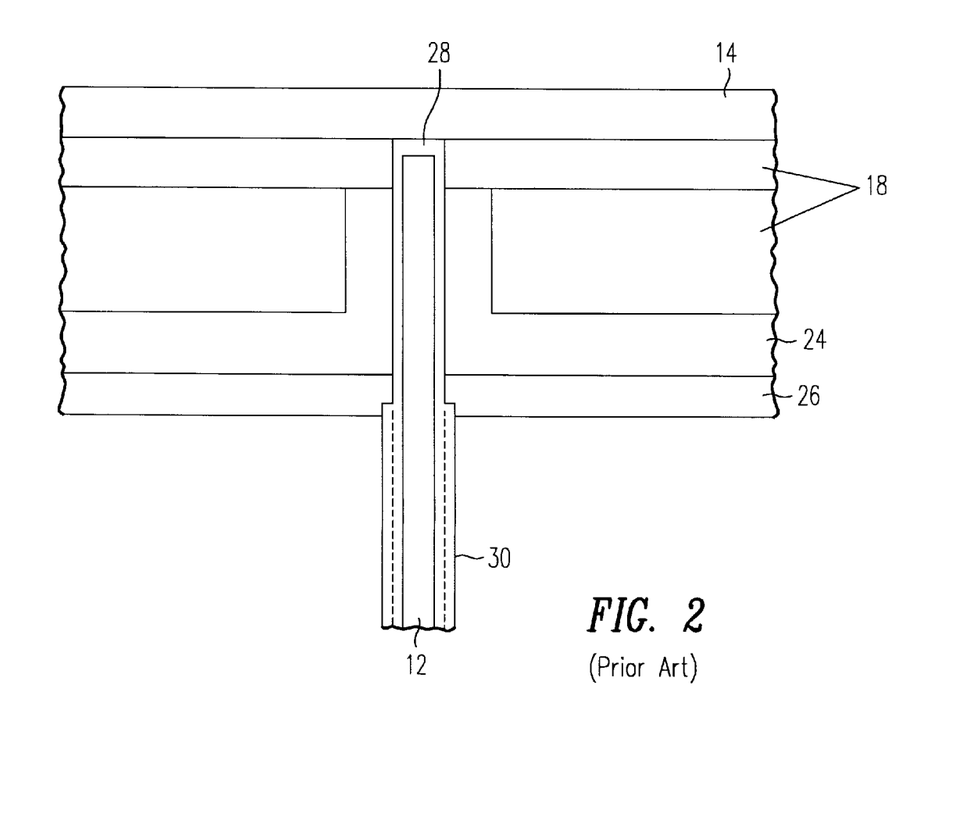
FIG. 2 is a side view of a lightpipe extending through a pedestal assembly, including an electrostatic chuck, a base plate, and a sealing plate.

FIG. 2 is a side view of lightpipe 12 extending through a pedestal assembly including electrostatic chuck 18 as well as a base plate 24 and a sealing plate 26. Electrostatic chuck 18, base plate 24 and sealing plate 26 all define an aperture 28 that has an inside diameter slightly larger than the outside diameter of lightpipe 12. Lightpipe 12 is positioned within a helium delivery system 30, which is in fluid communication with chamber 11 through aperture 28. As can be seen in FIG. 2, the end of lightpipe 12 is positioned slightly below wafer 14 such that lightpipe 12 and wafer 14 are not in physical contact.

Pyrometric systems conventionally use a single polished quartz rod or silica optical fiber as lightpipe 12. A polished quartz rod is a good IR optical path because it has minimal transmission loss, is inexpensive, and does not contaminate the environment of chamber 11. Moreover, a quartz rod allows little stray IR light to enter from the sides. The quartz rod lightpipe 12 is typically held in place with an O-ring so that is it unaffected by changes in the environmental conditions of chamber 11, such as changes in pressure.

Unfortunately, a quartz rod degrades from exposure to reactive plasmas such as fluorine, which is used during processing in chamber 11. Fluorine attack on a polished quartz rod, for example, produces a frosted surface over the exposed areas. Typically, the fluorine is quickly consumed and recombined on the surfaces of quartz rod lightpipe 12 so that only the upper portion of the lightpipe 12 is exposed to flourine attack, e.g. the upper one and a half inches of lightpipe 12. The degradation of the quartz rod due to fluorine attack changes the optical transmissibility of the quartz rod over time in an unpredictable manner. Consequently, the fluorine attack on the quartz rod has a deleterious affect on the calibration of the pyrometric system.

It is presently impossible to fabricate an IR optical material that is immune to fluorine attack in the length necessary to replace the entire lightpipe 12 in pyrometric system 10. Further, coating a quartz rod with an optical coating that is immune to fluorine attack is also extremely difficult. A mechanically coupled two-piece lightpipe design cannot be installed into existing chambers because of space constraints and interference with helium delivery system 30.

Thus, what is needed is an inexpensive plasma resistant lightpipe design that can be easily installed in existing chambers, is non-contaminating, and may be precisely positioned and solidly fixed in place so as to withstand changes in the environment of the chamber.

SUMMARY

A plasma resistant lightpipe assembly according to one embodiment of the present invention, includes two lightpipe elements in optical communication, where the first lightpipe element is less susceptible to degradation from reactive gas or plasma used in the processing chamber than the second lightpipe element. The first lightpipe element is a rod of plasma resistant material with good IR optical properties, such as sapphire, aluminum nitride, potassium chloride or other appropriate material, while the second lightpipe element is a quartz rod. The ends of the two rods are held in close proximity to each other thereby creating an optical path.

The first lightpipe element is securely mounted, such as by shrink fitting, press fitting, spring pins, or set screws, in a plug that is positioned between the seal plate and the ESC or base plate of the pedestal assembly. In one embodiment the plug holds the first lightpipe element such that the interface between the first lightpipe element and the second lightpipe element is in a plane defined by the top surface of the seal plate. Thus, when the electrostatic chuck and base plate are removed, the lightpipe elements will not be damaged. The plug is also used as part of the backside gas delivery path such that the interface between the first lightpipe element and second lightpipe element is located within the backside gas delivery path. In another embodiment, the first lightpipe element is directly mounted into the ESC or base plate of the pedestal structure. Consequently, there is no need for a plug.

BRIEF DESCRIPTION OF THE DRAWINGS

The above and other features, aspects, and advantages of the present invention will become better understood with regard to the following description, appended claims, and accompanying figures, where:

DETAILED DESCRIPTION

Figure 3:
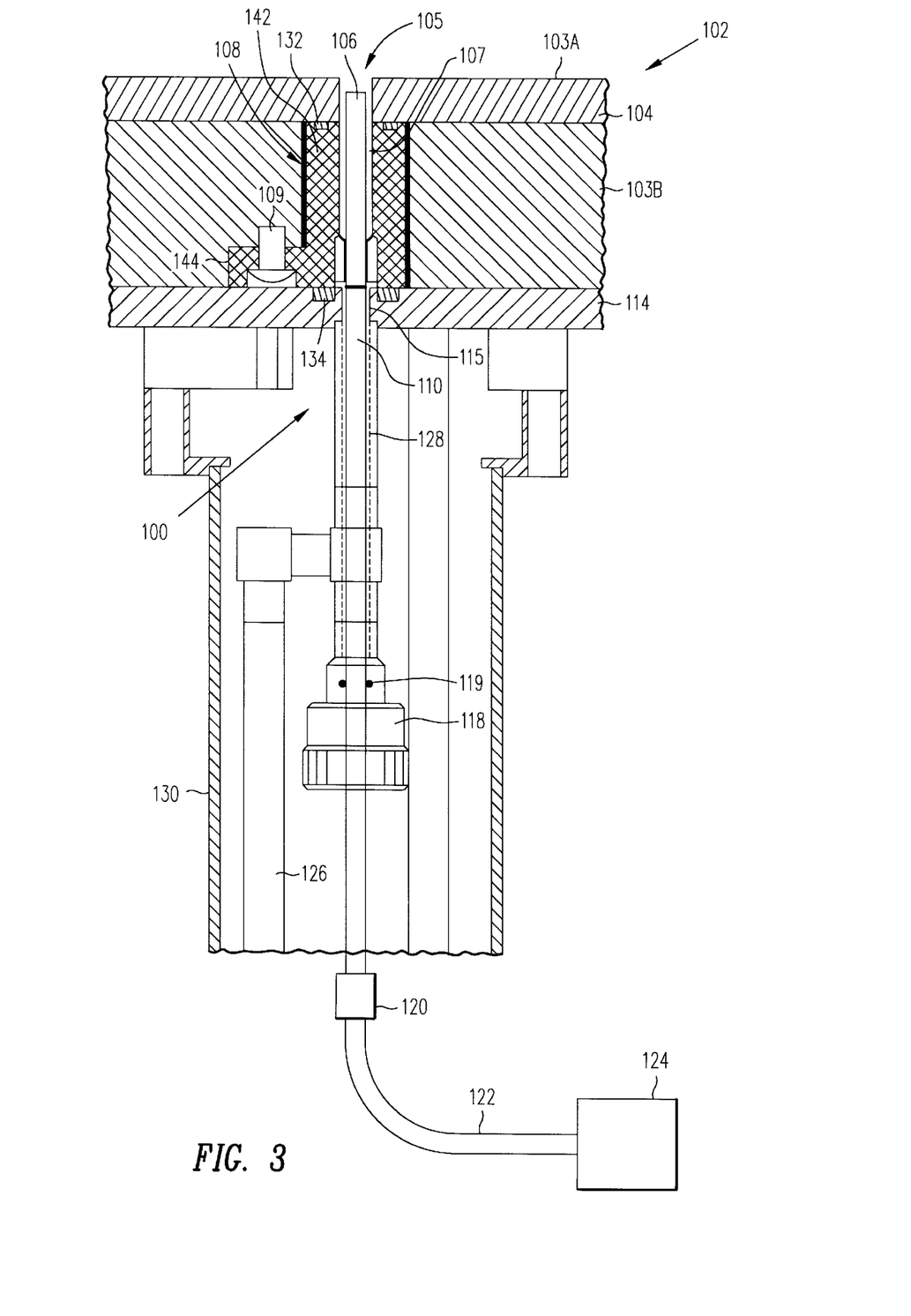
FIG. 3 is a side view of the junction of a plasma resistant lightpipe and pedestal assembly.

FIG. 3 is a side view of the junction of a plasma resistant lightpipe 100 and a pedestal assembly 102, which is used to hold a substrate within a processing chamber (not shown) such as a plasma reaction chamber. Lightpipe 100 includes a plasma resistant element that is positioned near the surface of pedestal assembly 102 and a second element that is in optical communication with the plasma resistant element. The plasma resistant element is a polished sapphire rod 106 that is mounted in a plug 108. The second element is a polished quartz rod 110. Sapphire rod 106 is less susceptible to etching from corrosive gases or plasmas than quartz rod 110. Thus, sapphire rod 106 is advantageously positioned such that the exposure of quartz rod 110 to corrosive gases within the processing chamber is limited.

Lightpipe 100 may be used in any conventional processing chamber, and is particularly useful where reactive plasmas are used, including fluorine, oxygen, or hydrogen containing plasmas. For example, lightpipe 100 may be used in a plasma reaction chamber model "SPEED" manufactured by Novellus Systems, Inc. located in San Jose, Calif. Further, while the plasma resistant element is described as a sapphire rod 106, it should be understood that other types of plasma resistant optical material may be used, such as aluminum nitride, silicon dioxide, or potassium chloride or other various alkali salts.

As shown in FIG. 3, the pedestal assembly 102 includes a conventional ESC 104, with a ceramic plate 103A bonded to a brass plate 103B, and a stainless steel seal plate 114. During processing, the backside of a wafer (not shown) is positioned on the surface of ESC 104 and conventionally held in place. Sapphire rod 106 is located in an aperture 105 in ESC 104 and an aperture 107 in plug 108. The inside diameter of apertures 105 and 107 is approximately 5 mm while the outside diameter of sapphire rod 106 is approximately 3 mm. The end of sapphire rod 106 is positioned approximately 0.5 mm below the plane defined by the top surface of ESC 104. Thus, sapphire rod 106 does not physically contact the wafer (not shown) when the wafer is placed on the top surface of ESC 104 during processing.

Quartz rod 110 is mounted in the center of a stainless steel tube 128 such that there is clearance between the inside walls of tube 128 and quartz rod 110 to permit the passage of gas, including but not limited to helium, argon, and nitrogen. Tube 128 is approximately a quarter of an inch in diameter, however the size may vary to permit a greater or lesser volume of gas to flow. Moreover, tube 128 may be made of any appropriate rigid material, such as aluminum. Quartz rod 110 passes through an aperture 115 in seal plate 114. Aperture 115 also permits the passage of gas. Thus, apertures 115, 107, and 105 place the chamber in fluid communication with tube 128 thereby permitting the gas to be delivered to the backside of the wafer. Tube 128 is positioned within an RF delivery tube 130, which is conventionally coupled to seal plate 114 and provides radio frequency power to ESC 104.

Although pedestal assembly 102 is described in the present disclosure as including ESC 104 to hold a wafer, it should be understood that plasma resistant lightpipe 100 may be used in conjunction with systems that do not use an ESC. Thus, lightpipe 100 may be used in a pedestal assembly that uses a vacuum, electrostatic force, gravity, or mechanical clamps to hold the wafer. Further, lightpipe 100 may be used in a pedestal assembly that includes a brass base plate between ESC 104 and seal plate 114.

Plug 108 is made of aluminum or other similarly rigid, non-corrosive material, e.g. stainless steel. Plug 108 is mounted within ESC 104 and abuts seal plate 114 in a secure manner. For example, a screw 109 threaded in a bore in ESC 104 holds plug 108 in the desired position. As will be understood by those of ordinary skill in the art, there are many methods of securing plug 108 in its desired position, including gluing, welding, shrink and/or interference fitting as well as any other mechanical fastener that is held in pedestal 102. A seal is created between plug 108 and ESC 104 with O-ring 132 and between plug 108 and seal plate 114 with O-ring 134.

Plug 108 is easily removed by removing ESC 104 and base plate 112. Inserting plug 108 is accomplished by mounting plug 108 to base plate 112 with screw 109 for example. Base plate 112 and ESC 104 are then conventionally mounted on seal plate 114 by screws or clamps (not shown). Once base plate 112 and ESC 104 are securely mounted, quartz rod 110 is adjusted upward until the end of quartz rod 110 contacts the end of sapphire rod 106. Quartz rod 110 is then secured in place using a compressed O-ring 119.

Plug 108 includes a tube portion 142 and a foot 144. As will be discussed below, sapphire rod 106 is mounted in plug 108 such that one end of sapphire rod 106 extends to approximately 0.5 mm from the top surface of ESC 104 and the other end is in optical communication with quartz rod 110. As shown in FIG. 3, sapphire rod 106 and quartz rod 110 are in physical contact. However, the ends of sapphire rod 106 and quartz rod 110 may be in optical communication by being held in close proximity to each other, e.g., up to a few millimeters depending on the desired pyrometer sensitivity and desired minimum measurable temperature. To achieve the greatest pyrometer sensitivity and the lowest minimum measurable temperature, the ends of sapphire rode 106 and quartz rod 110 are held in physical contact. Where the ends of sapphire rod 106 and quartz rod 110 are not in physical contact, it is important that the separation between the two rods is reproducible for consistent calibration of the pyrometer system.

In one embodiment the plane defined by the interface between sapphire rod 106 and quartz rod 110 is approximately coincident with the plane defined by ESC 104 and seal plate 114. Thus, ESC 104 and plug 108 may be easily removed without damaging either sapphire rod 106 or quartz rod 110.

Both ends and the outside diameter of sapphire rod 106 and quartz rod 110 are polished. The outside diameter of sapphire rod 106 is approximately 3 mm. Quartz rod 110 has a slightly larger outside diameter than sapphire rod 106, approximately 4 mm, to minimize variable optical losses due to slight misalignment between sapphire rod 106 and quartz rod 110. Although approximately fifty percent of transmission efficiency is lost at the interface between sapphire rod 106 and quartz rod 110, this loss may be compensated by adjusting the gain in pyrometric monitor 124.

Sapphire rod 106 is securely mounted in plug 108 such that changes in the environment, e.g. pressure, will not affect its position. For example, sapphire rod 106 may be shrink fitted by fitting sapphire rod 106 into plug 108 while plug 108 is hot. Upon return to normal temperatures, sapphire rod 106 will be held rigidly in place by plug 108. Sapphire rod 106 may also be mounted in plug 108 using conventional methods including interference fitting, spring pins, and set-screws.

Lightpipe 100 additionally includes a conventional mechanical rod vacuum seal 118 that is connected to tube 128 through which quartz rod 110 is disposed. Quartz rod 110 is secured in place with O-ring 119 within vacuum seal 118. A gas delivery tube 126 is connected to tube 128 between mechanical rod vacuum seal 118 and plate seal 114. The gas can then be delivered to the backside of the wafer in the chamber through tube 128 and respective apertures 115, 107, and 105.

A rod-fiber coupler 120 connects quartz rod 110 to a fiber cable 122. Fiber cable 122 is received by a conventional pyrometric monitor 124 that converts the intensity or wavelength of light detected by lightpipe 100 into a temperature measurement. For example a model number NTM-3 pyrometric monitor manufactured by CI Systems LTD, located in Migdal Haemek, Isreal, may be used.

Figure 4A:
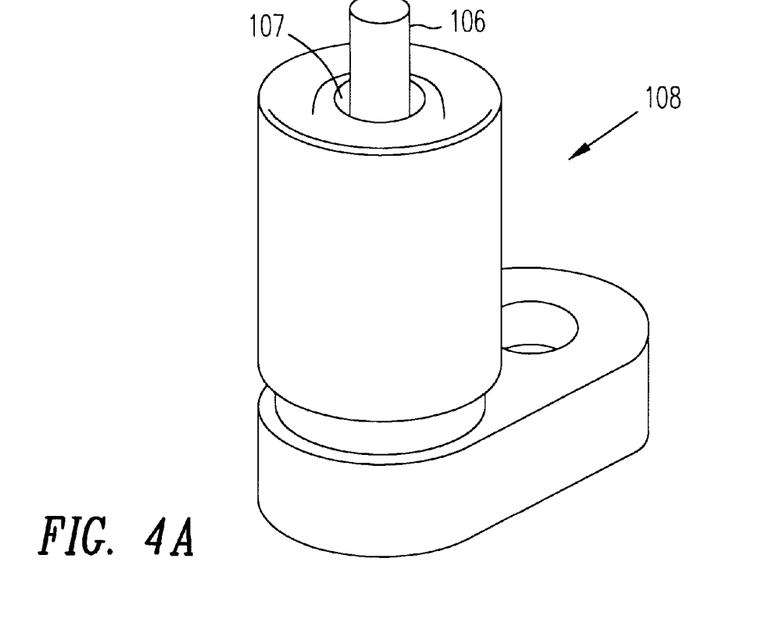
FIGS. 4A and 4B provide a respective top and bottom perspective view of a plug holding a sapphire rod.
Figure 4B:
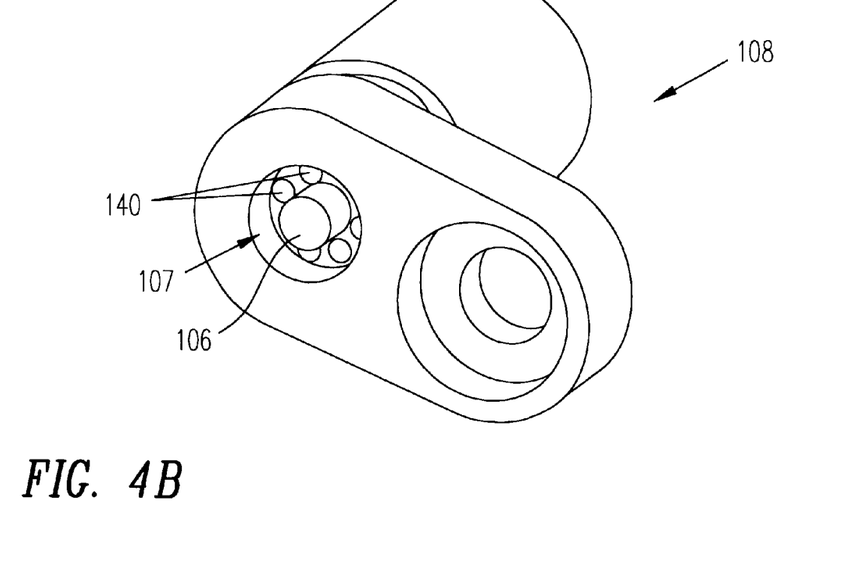

FIGS. 4A and 4B provide a respective top and bottom perspective view of plug 108 with sapphire rod 106. The holes 140 for gas delivery to the reaction chamber can be seen in FIG. 4B.

Figure 5:
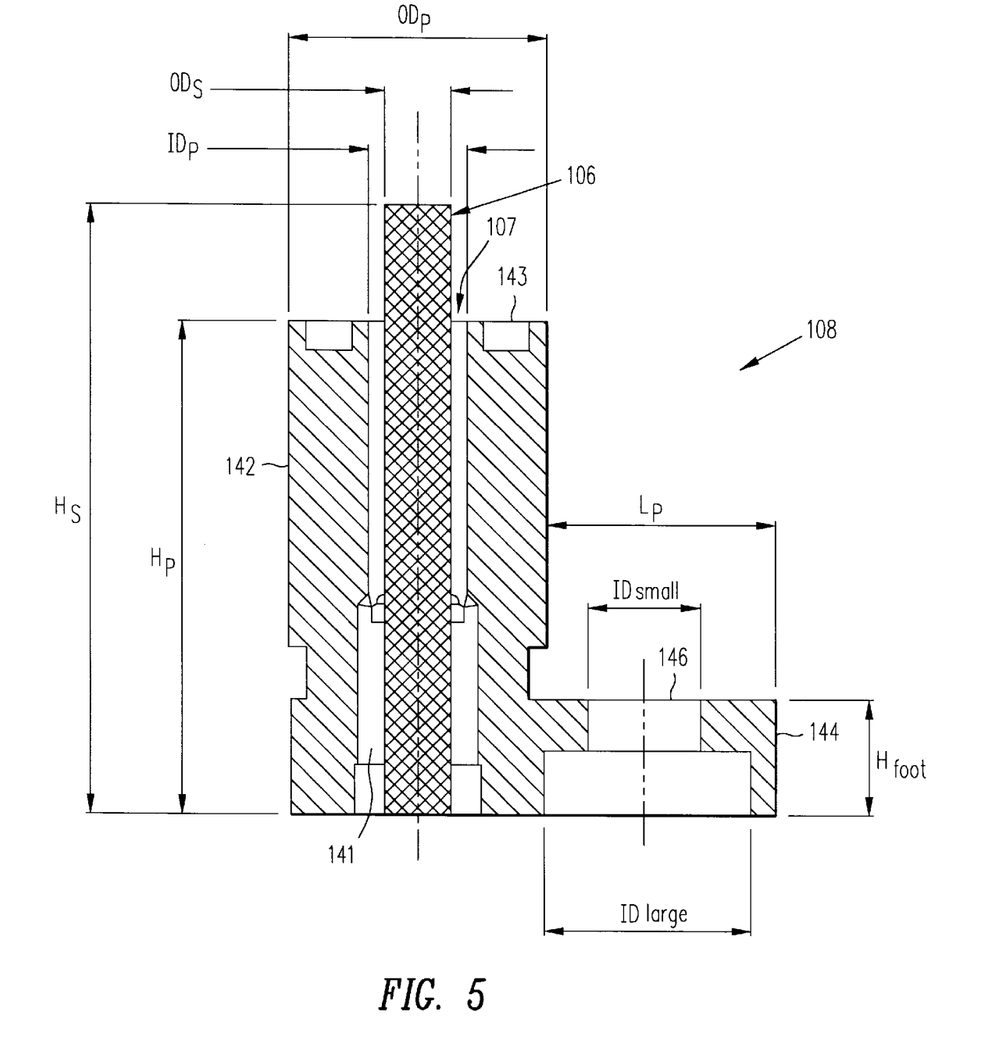
FIG. 5 shows a side view of a plug holding a sapphire rod.
Figure 6A:
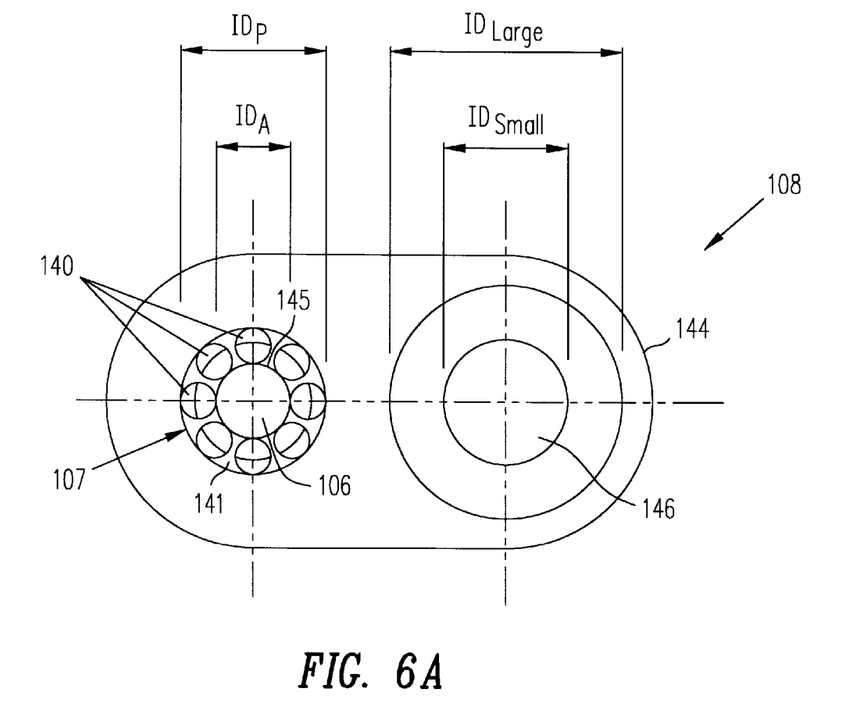
FIGS. 6A and 6B show respective bottom and plan views of the plug holding a sapphire rod.
Figure 6B:
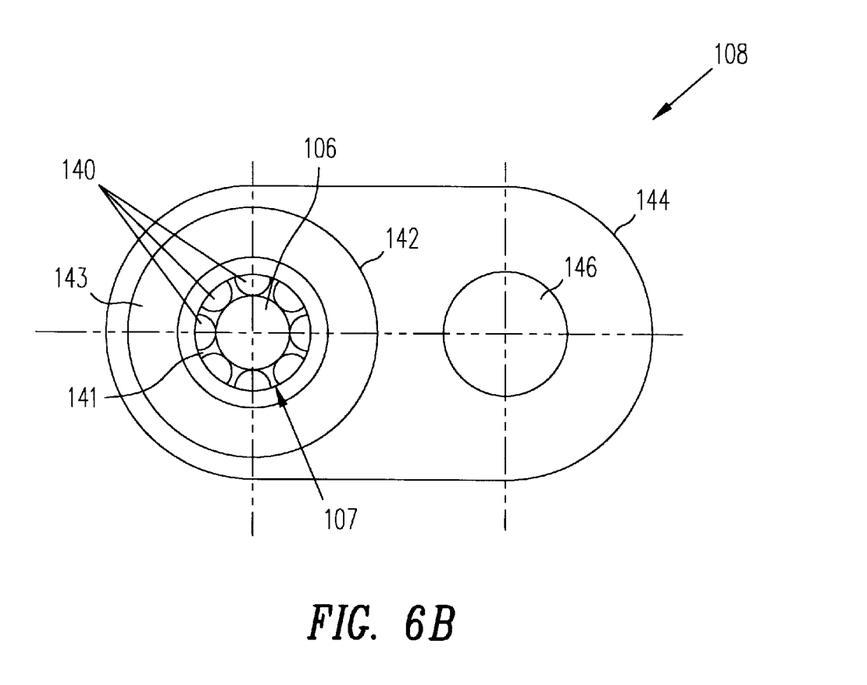

FIG. 5 shows a side view of plug 108, while FIGS. 6A and 6B show respective bottom and plan views of plug 108. As shown in FIG. 5, plug 108 has a tube portion 142 with a height $H_p$ of 25.04 mm, an outside diameter $OD_P$ of 13.00 mm, and an inside diameter $ID_P$ of 5 mm. Tube portion 142 also includes an annular grove 143 to accommodate O-ring 132 (shown in FIG. 3). A foot 144 of plug 108 has a height $H_{FOOT}$ of 5.94 mm and a length $L_P$ of 11.18 mm. An aperture 146 in foot 144 for screw 109 (shown in FIG. 3) has a small inside diameter $ID_{small}$ of 5.6 mm and a large inside diameter $ID_{large}$ of 10.4 mm. Sapphire rod 106 has an outside diameter $OD_S$ of 3 mm, and a height $H_S$ of 32 mm. Of coarse these dimensions are illustrative and other dimensions may be used if desired.

FIGS. 6A and 6B show respective bottom and plan views of plug 108 with a ring 141 within aperture 107 in plug 108. Ring 141 is an integral part of plug 108, i.e., plug 108 is machined from one piece of aluminum. Of course, ring 141 may alternatively be shrink and/or interference fitted or otherwise mounted into aperture 107 in plug 108. Ring 141 includes an aperture 145, through which sapphire rod 106 is inserted, and several smaller apertures 140 around the periphery of sapphire rod 106 that are used as the backside gas delivery path. When sapphire rod 106 is shrink fitted into plug 108, the sapphire rod is actually press fitted into aperture 145 while ring 141 is hot. When ring 141 returns to normal temperature, sapphire rod 106 will be held securely in place within aperture 145. When shrink fitting is used, the outside diameter $OD_S$ of sapphire rod 106 is 0.1250"±0.0001" (inches) and the inside diameter $ID_A$ of aperture 145 in ring 141 is 0.1247"±0.0001", as shown in FIG. 6A. Ring 141 may also be replaced with spring pins or set screws.

Figure 7:
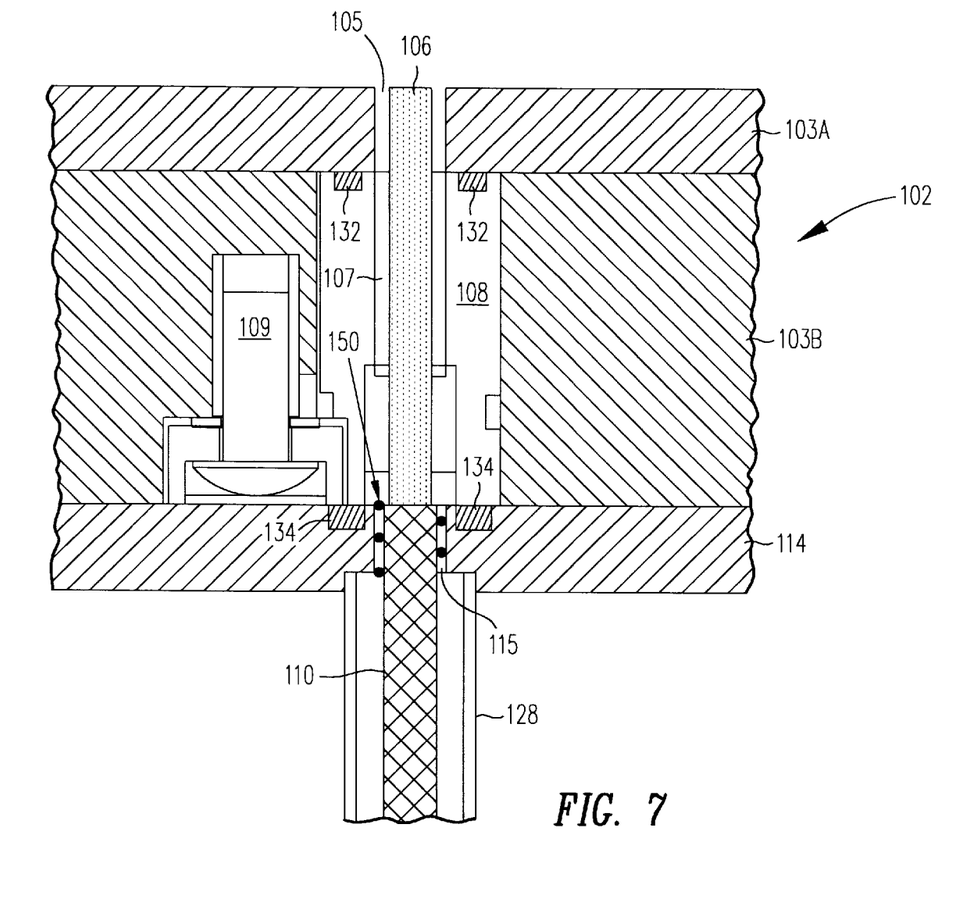
FIG. 7 is a close up side view of the pedestal assembly shown in FIG. 3 including a centering coil in the seal plate used to eliminate misalignment of the lightpipes.

FIG. 7 is a close up side view of pedestal assembly 102 with plug 108. FIG. 7 shows a centering coil 150 positioned in aperture 115 of seal plate 114. Centering coil 150 is used to center quartz rod 110 under sapphire rod 106 to eliminate variable optical losses due to misalignment, while permitting gas to flow through aperture 115. To install centering coil 150, the end of quartz rod 110 is first inserted into centering coil 150. Quartz rod 110 is then inserted into aperture 115 of seal plate 114 until centering coil 150 is positioned in aperture 115.

Figure 8:
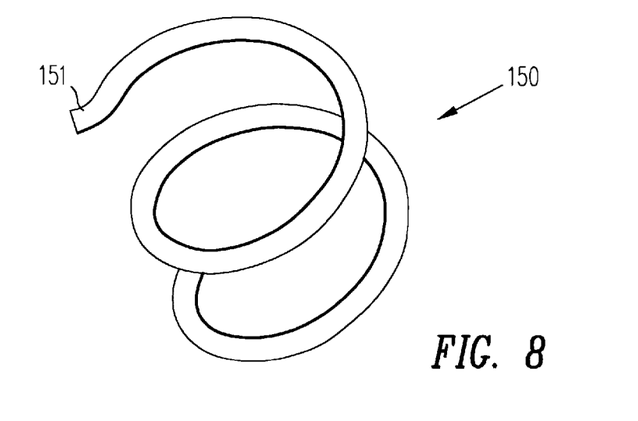
FIG. 8 is a perspective view of the centering coil shown in FIG. 7.

FIG. 8 is a perspective view of centering coil 150. Centering coil 150 includes a tail 151 that sits on the top surface of seal plate 114 when centering coil 150 is positioned in aperture 115 as shown in FIG. 7. Thus, centering coil 150 is prevented from falling through seal plate 114 during installation.

Figure 9:
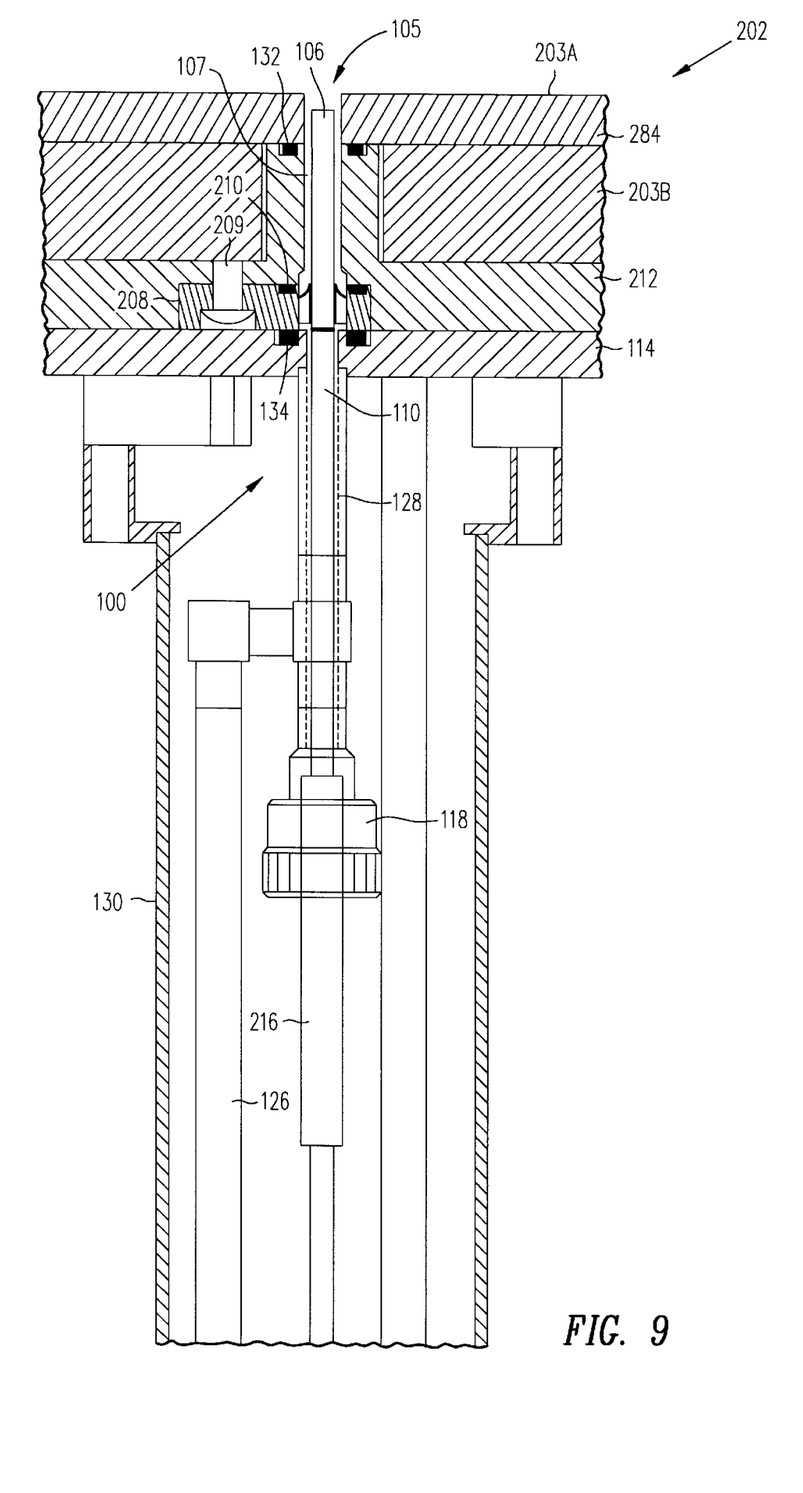
FIG. 9 is a side view of another embodiment of the plug holding plasma resistant lightpipe in a pedestal assembly.

FIG. 9 is side view of a different embodiment of a plug 208 holding plasma resistant lightpipe 100 in a pedestal assembly 202. Pedestal assembly 202 is similar to pedestal assembly 102 shown in FIG. 3, however, a brass base plate 212 is located between ESC 204 and seal plate 114. In addition, a connector fitting 216 is used with lightpipe 100. Connector fitting 116 is a stainless steel sleeve that is glued or otherwise connected to quartz rod 110 to provide additional strength to quartz rode 110 at the connection of mechanical rod vacuum seal 118. Other types of comparably strong and non-corrosive material may also be used as connector fitting 116.

Plug 208 is similar to plug 108 shown in FIG. 3, however, plug 208 has no tube portion 142. Thus, sapphire rod 106 is mounted in plug 208 using shrink and/or interference fitting, spring pins and set-screws in a similar manner as that described in reference to plug 108. Plug 208 also includes holes around sapphire rod 106 for the backside gas delivery path.

Plug 208 is mounted within base plate 212 with screw 209 and abuts seal plate 114. An additional O-ring 210 is used to seal the interface between base plug 208 and base plate 112. It should be understood that plug 208 may also be installed within pedestal 102 as shown in FIG. 3.

In one embodiment, sapphire rod 106 is mounted in plug 208 such that the interface between sapphire rod 106 and quartz rod 110 is in the same plane as that defined by base plate 212 and seal plate 114, as shown in FIG. 9.

Figure 10:
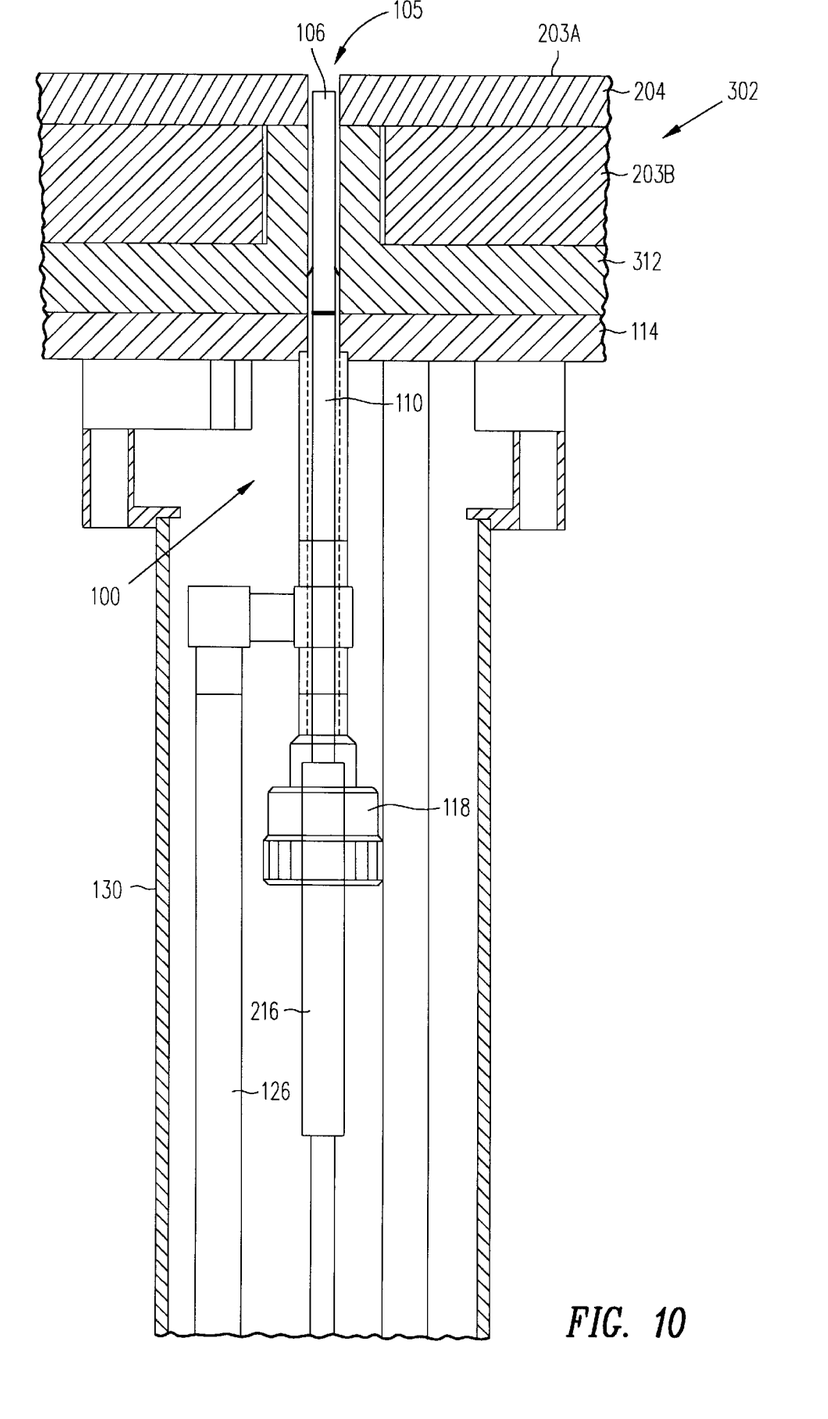
FIG. 10 is a side view of plasma resistant lightpipe being held by the base plate within the pedestal assembly.

In another embodiment of the present invention, sapphire rod 106 is shrink-fit mounted or otherwise appropriately secured directly into base plate 312 of pedestal assembly 302, as shown in FIG. 10. The embodiment shown in FIG. 10 is similar to the embodiment shown in FIG. 9, like designated elements being the same. However, as shown in FIG. 10, because sapphire rod 106 is directly mounted in base plate 312 there is no need for a plug to secure sapphire rod 106.

Although the present invention has been described in considerable detail with reference to certain versions thereof, other versions are possible. For example, the plasma resistant lightpipe element is not necessarily a sapphire rod, but may be a rod of any plasma resistant material with acceptable optical properties, such as aluminum nitride, silicon dioxide, or potassium chloride or other various alkali salts. Moreover, the lightpipe assembly may be used to measure the temperature of any kind of substrate in any kind of chamber where it is desirable to minimize degradation of lightpipe 100 caused by corrosive gases, and is not limited to use solely in a plasma reaction chamber. Therefore, the spirit and scope of the appended claims should not be limited to the description of the versions depicted in the figures.

What is claimed is:

1. An apparatus comprising:
   a pedestal assembly for supporting a substrate, said pedestal assembly having a top surface, an aperture being formed in said top surface;
   a backside gas delivery path that includes said aperture in said top surface; and
   a lightpipe comprising a first lightpipe element and a second lightpipe element, said first lightpipe element being mounted in said pedestal assembly and positioned within said aperture, said first lightpipe element and said second lightpipe element being in optical communication at a junction between said first lightpipe element and said second lightpipe element, said junction being located within said backside gas delivery path;

wherein said first lightpipe element is less susceptible to degradation from a reactive gas used in said apparatus than said second lightpipe element.

2. The apparatus of claim 1, wherein said first lightpipe element is a sapphire rod and said second lightpipe element is a quartz rod.

3. The apparatus of claim 1, wherein said first lightpipe element is an aluminum nitride rod and said second lightpipe element is a quartz rod.

4. The apparatus of claim 1, wherein said pedestal assembly comprises an electrostatic chuck and a seal plate, said first lightpipe element mounted in said electrostatic chuck.

5. The apparatus of claim 4, said seal plate having an aperture that is included in said backside gas delivery path, wherein said second lightpipe element extends through said aperture of said seal plate.

6. The apparatus of claim 5, wherein said second lightpipe element is positioned in said aperture of said seal plate with a centering coil.

7. The apparatus of claim 1, wherein said first lightpipe element and said second lightpipe element are in physical contact.

8. The apparatus of claim 1, wherein said first lightpipe element is mounted in said pedestal assembly by shrink fitting.

9. The apparatus of claim 1 further comprising a fiber optic cable which is coupled to an end of said second lightpipe element and connected to a pyrometric monitor.

10. The apparatus of claim 1, wherein said second lightpipe element is a quartz rod.

11. An apparatus comprising:
a pedestal assembly for supporting a substrate, said pedestal assembly having a top surface, an aperture being formed in said top surface, said pedestal assembly comprising an electrostatic chuck and a seal plate;
a backside gas delivery path that includes said aperture in said top surface; and
a lightpipe comprising a first lightpipe element and a second lightpipe element, said first lightpipe element being mounted in said pedestal assembly and positioned within said aperture, said first lightpipe element and said second lightpipe element being in optical communication at a junction between said first lightpipe element and said second lightpipe element, said junction being located within said backside gas delivery path;
wherein said first lightpipe element is less susceptible to degradation from a reactive gas used in said apparatus than said second lightpipe element; and
wherein said first lightpipe element is mounted in a plug inserted in said electrostatic chuck.

12. The apparatus of claim 11, wherein said second lightpipe element is a quartz rod.

13. The apparatus of claim 11, wherein said first lightpipe element is a sapphire rod and said second lightpipe element is a quartz rod.

14. The apparatus of claim 11, wherein said first lightpipe is an aluminum nitride rod and said second lightpipe element is a quartz rod.

15. An apparatus comprising:
a pedestal assembly for supporting a substrate, said pedestal assembly having a top surface, an aperture being formed in said top surface, said pedestal assembly comprising an electrostatic chuck and a seal plate;
a backside gas delivery path that includes said aperture in said top surface; and
a lightpipe comprising a first lightpipe element and a second lightpipe element, said first lightpipe element mounted in said pedestal assembly and positioned within said aperture, said first lightpipe element and said second lightpipe element being in optical communication at a junction between said first lightpipe element and said second lightpipe element, said junction being located within said backside gas delivery path;
wherein said first lightpipe element is less susceptible to degradation from a reactive gas used in said apparatus than said second lightpipe element;
wherein said first lightpipe element is mounted in said electrostatic chuck; and
wherein the interface between said first lightpipe element and said second lightpipe element is in a plane defined by the top surface of said seal plate.

16. The apparatus of claim 15, wherein said second lightpipe element is a quartz rod.

17. The apparatus of claim 15, wherein said first lightpipe element is a sapphire rod and said second lightpipe element is a quartz rod.

18. The apparatus of claim 15, wherein said first lightpipe element is an aluminum nitride rod and said second lightpipe is a quartz rod.

19. A temperature monitor positioned in a processing chamber, said temperature monitor comprising:
a lightpipe having a first lightpipe element and a second lightpipe element, said first lightpipe element being less susceptible to degradation from reactive gas in said processing chamber than said second lightpipe element, said first lightpipe element being in optical communication with the inside of said processing chamber and being in optical communication with said second lightpipe element.

20. The temperature monitor of claim 19, wherein said first lightpipe element is a sapphire rod and said second lightpipe element is a quartz rod.

21. The temperature monitor of claim 19, wherein said first lightpipe element is an aluminum nitride rod and said second lightpipe element is a quartz rod.

22. The temperature monitor of claim 19, wherein said first lightpipe element and said second lightpipe element are in physical contact.

23. The temperature monitor of claim 19, wherein said second lightpipe element is a quartz rod.

24. A method of measuring the temperature of a substrate within a chamber, said method comprising:
placing a first lightpipe element in optical communication with said substrate and fluid communication with the inside of said chamber;
placing a second lightpipe element in optical communication with said first lightpipe element and fluid communication with the inside of said chamber;
measuring the intensity of light emanating from said substrate through said first lightpipe element and said second lightpipe element; and
converting said intensity of light into a temperature;
wherein said first lightpipe element is less susceptible to degradation from reactive gas in said chamber than said second lightpipe element.

25. The method of claim 24, wherein said first lightpipe element is a sapphire rod and said second lightpipe element is a quartz rod.

26. The method of claim 24, wherein said first lightpipe element is an aluminum nitride rod and said second lightpipe element is a quartz rod.

27. The method of claim 24, wherein said second lightpipe element is a quartz rod.

28. A method of measuring the temperature of a substrate within a chamber, said method comprising:

placing a first lightpipe element in optical communication with said substrate and fluid communication with the inside of said chamber, said placing a first lightpipe element in optical communication with said substrate comprising:
   mounting said first lightpipe element in a plug; and
   placing said plug in a pedestal assembly within said chamber;

placing a second lightpipe element in optical communication with said first lightpipe element and fluid communication with the inside of said chamber;

measuring the intensity of light emanating from said substrate through said first lightpipe element and said second lightpipe element; and converting said intensity of light into a temperature;

wherein said first lightpipe element is less susceptible to degradation from reactive gas in said chamber than said second lightpipe element.

29. The method of claim 28, wherein said first lightpipe element is mounted in said plug by shrink fitting.

30. The method of claim 28, wherein said second lightpipe element is a quartz rod.

31. The method of claim 28, wherein said first lightpipe element is a sapphire rod and said second lightpipe element is a quartz rod.

32. The method of claim 28, wherein said first lightpipe element is an aluminum nitride rod and said second lightpipe element is a quartz rod.

* * * * *